(12) United States Patent
Kaliyaperumal et al.

(10) Patent No.: US 10,684,037 B2
(45) Date of Patent: Jun. 16, 2020

(54) THERMOSTAT AND METHOD FOR CONTROLLING AN HVAC SYSTEM WITH REMOTE TEMPERATURE SENSOR AND ONBOARD TEMPERATURE SENSOR

(71) Applicant: Trane International Inc., Davidson, NC (US)

(72) Inventors: Arulkumar Kaliyaperumal, TamilNadu (IN); Christopher Blake Smith, Whitehouse, TX (US); John Hughes, Flint, TX (US); Vinoth Vairamudi, TamilNadu (IN); Satish Mukundan Thiruvengadam, TamilNadu (IN); Wayne N. Kraft, Tyler, TX (US)

(73) Assignee: Trane International Inc., Davidson, NC (US)

( * ) Notice: Subject to any disclaimer, the term of this patent is extended or adjusted under 35 U.S.C. 154(b) by 280 days.

(21) Appl. No.: 15/724,895

(22) Filed: Oct. 4, 2017

(65) Prior Publication Data
US 2019/0101303 A1 Apr. 4, 2019

(51) Int. Cl.
*F24F 11/56* (2018.01)
*G05D 23/19* (2006.01)
(Continued)

(52) U.S. Cl.
CPC .............. *F24F 11/56* (2018.01); *F24F 11/30* (2018.01); *F24F 11/32* (2018.01); *F24F 11/38* (2018.01);
(Continued)

(58) Field of Classification Search
CPC .. F24F 11/56; F24F 11/64; F24F 11/62; F24F 11/58; F24F 11/38; F24F 11/32; G05D 23/1931; G05B 2219/2614
See application file for complete search history.

(56) References Cited

U.S. PATENT DOCUMENTS 4,381,075 A 4/1983 Cargill et al.
5,341,988 A 8/1994 Rein et al.
(Continued)

OTHER PUBLICATIONS

Dong et al., New Digital Thermostat Development, 2015 14th International Symposium on Distributed Computing and Applications for Business Engineering and Science, pp. 376-379 (Year: 2015).*

*Primary Examiner* — Toan M Le
(74) *Attorney, Agent, or Firm* — The Salerno Law Firm, P.C.

(57) ABSTRACT

A heating, ventilation and air condition (HVAC) system is provided. The system includes a thermostat including an onboard temperature sensor, a remote temperature sensor in operable communication with the thermostat, and a controller in operable communication with each of the onboard sensor and the remote sensor and configured to execute a control algorithm that calculates a temperature difference between a temperature detected by the onboard temperature sensor and a temperature detected by the remote temperature sensor, such that when the remote temperature sensor fails, the controller uses the calculated temperature difference to calibrate the onboard temperature sensor and set the thermostat to the temperature detected by the remote temperature sensor.

24 Claims, 8 Drawing Sheets

(51) Int. Cl.
    *G05B 19/048* (2006.01)
    *F24F 11/30* (2018.01)
    *F24F 11/62* (2018.01)
    *F24F 11/65* (2018.01)
    *F24F 11/32* (2018.01)
    *F24F 11/61* (2018.01)
    *F24F 11/52* (2018.01)
    *G05B 19/042* (2006.01)
    *F24F 11/38* (2018.01)
    *F24F 11/64* (2018.01)
    *F24F 110/10* (2018.01)
    *F24F 11/58* (2018.01)

(52) U.S. Cl.
    CPC .............. *F24F 11/52* (2018.01); *F24F 11/61*
        (2018.01); *F24F 11/62* (2018.01); *F24F 11/65*
        (2018.01); *G05B 19/042* (2013.01); *G05B*
        *19/048* (2013.01); *G05D 23/1931* (2013.01);
        *F24F 11/58* (2018.01); *F24F 11/64* (2018.01);
        *F24F 2110/10* (2018.01); *G05B 2219/2614*
        (2013.01)

(56) References Cited

U.S. PATENT DOCUMENTS

| | | |
|---|---|---|
| 5,361,985 A | 11/1994 | Rein et al. |
| 5,390,206 A | 2/1995 | Rein et al. |
| 5,394,934 A | 3/1995 | Rein et al. |
| 5,469,150 A | 11/1995 | Sitte |
| 5,598,715 A | 2/1997 | Edmisten |
| 5,911,747 A | 6/1999 | Gauthier |
| 6,104,963 A | 8/2000 | Cebasek et al. |
| 6,115,713 A | 9/2000 | Pascucci et al. |
| 6,234,016 B1 | 5/2001 | Bonne et al. |
| 6,467,696 B2 | 10/2002 | Riley et al. |
| 6,481,635 B2 | 11/2002 | Riley et al. |
| 6,637,667 B2 | 10/2003 | Gauthier et al. |
| 6,851,621 B1 | 2/2005 | Wacker et al. |
| 7,055,759 B2 | 6/2006 | Wacker et al. |
| 7,079,023 B2 | 7/2006 | Haller |
| 7,083,109 B2 | 8/2006 | Pouchak |
| 7,102,504 B2 | 9/2006 | Kates |
| 7,102,505 B2 | 9/2006 | Kates |
| 7,103,511 B2 | 9/2006 | Petite |
| 7,142,107 B2 | 11/2006 | Kates |
| 7,202,624 B2 | 4/2007 | Hardt et al. |
| 7,222,800 B2 | 5/2007 | Wruck |
| 7,228,693 B2 | 6/2007 | Helt |
| 7,230,528 B2 | 6/2007 | Kates |
| 7,341,201 B2 | 3/2008 | Stanimirovic |
| 7,347,774 B2 | 3/2008 | Aronstam et al. |
| 7,411,494 B2 | 8/2008 | Kates |
| 7,412,839 B2 | 8/2008 | Jayanth |
| 7,512,450 B2 | 3/2009 | Ahmed |
| 7,516,622 B2 | 4/2009 | Gauthier et al. |
| 7,548,833 B2 | 6/2009 | Ahmed |
| 7,555,364 B2 | 6/2009 | Poth et al. |
| 7,565,813 B2 | 7/2009 | Pouchak |
| 7,664,573 B2 | 2/2010 | Ahmed |
| 7,706,923 B2 | 4/2010 | Amundson et al. |
| 7,740,184 B2 | 6/2010 | Schnell et al. |
| 7,793,510 B2 | 9/2010 | Perry et al. |
| 7,848,765 B2 | 12/2010 | Phillips et al. |
| 8,078,325 B2 | 12/2011 | Poth |
| 8,131,399 B2 | 3/2012 | Ahmed |
| 8,239,067 B2 | 8/2012 | Amundson et al. |
| 8,322,155 B2 | 12/2012 | Tutunoglu et al. |
| 8,327,656 B2 | 12/2012 | Tutunoglu et al. |
| 8,393,169 B2 | 3/2013 | Pham |
| 8,467,905 B2 | 6/2013 | George |
| 8,510,255 B2 | 8/2013 | Fadell et al. |
| 8,554,376 B1 | 10/2013 | Matsuoka et al. |
| 8,630,740 B2 | 1/2014 | Matsuoka et al. |
| 8,863,536 B1 | 10/2014 | Perry et al. |
| 8,918,218 B2 | 12/2014 | Grabinger et al. |
| 8,963,726 B2 | 2/2015 | Kates |
| 8,963,727 B2 | 2/2015 | Kates |
| 8,963,728 B2 | 2/2015 | Kates |
| 8,981,950 B1 | 3/2015 | Kates |
| 9,002,526 B2 | 4/2015 | Matsuoka et al. |
| 9,020,646 B2 | 4/2015 | Matsuoka et al. |
| 9,020,647 B2 | 4/2015 | Johnson et al. |
| 9,089,814 B2 | 7/2015 | Pendergrass et al. |
| 9,152,154 B2 | 10/2015 | Gupta et al. |
| 9,175,868 B2 | 11/2015 | Fadell et al. |
| 9,183,733 B2 | 11/2015 | Kates |
| 9,256,230 B2 | 2/2016 | Matsuoka et al. |
| 9,286,787 B2 | 3/2016 | Kates |
| 9,286,788 B2 | 3/2016 | Kates |
| 9,291,359 B2 | 3/2016 | Fadell et al. |
| 9,318,015 B2 | 4/2016 | Kates |
| 9,357,490 B2 | 5/2016 | Kates |
| 9,417,637 B2 | 8/2016 | Matsuoka et al. |
| 9,474,023 B1 | 10/2016 | Kates |
| 9,500,379 B2 | 11/2016 | Schnell et al. |
| 9,513,642 B2 | 12/2016 | Rogers et al. |
| 9,740,385 B2 | 8/2017 | Fadell et al. |
| 9,791,839 B2 | 10/2017 | Matsuoka et al. |
| 9,791,872 B2 | 10/2017 | Wang et al. |
| 9,851,728 B2 | 12/2017 | Matsuoka et al. |
| 2007/0229237 A1 | 10/2007 | Kates |
| 2008/0141754 A1 | 6/2008 | Kates |
| 2008/0307803 A1 | 12/2008 | Herzon |
| 2010/0206039 A1 | 8/2010 | Kates |
| 2010/0298957 A1 | 11/2010 | Sanchez Rocha et al. |
| 2012/0022701 A1 | 1/2012 | Amundson et al. |
| 2013/0201316 A1 | 8/2013 | Binder et al. |
| 2014/0207394 A1 | 7/2014 | Madden et al. |
| 2014/0207721 A1 | 7/2014 | Filson et al. |
| 2014/0317029 A1 | 10/2014 | Matsuoka et al. |
| 2014/0358291 A1 | 12/2014 | Wells |
| 2015/0134123 A1 | 5/2015 | Obinelo |
| 2016/0041541 A1 | 2/2016 | Drees et al. |
| 2016/0305681 A1 | 10/2016 | Matsuoka et al. |
| 2017/0146261 A1 | 5/2017 | Rogers et al. |

\* cited by examiner

THERMOSTAT AND METHOD FOR CONTROLLING AN HVAC SYSTEM WITH REMOTE TEMPERATURE SENSOR AND ONBOARD TEMPERATURE SENSOR

BACKGROUND

Field of the Disclosure

The present disclosure generally relates to a heating, ventilation and air conditioning (HVAC) system, and more particularly, to a thermostat and method for controlling an HVAC system with a remote temperature sensor and an onboard temperature sensor.

Description of the Related Art

HVAC systems which regulate environmental conditions within an enclosed area of a commercial building or residential home are known. Residential HVAC systems are typically controlled by a thermostat, e.g., a smart thermostat. With respect to commercial buildings, the HVAC systems are typically controlled by a building automation system (BAS) or HVAC equipment control system.

Conventional thermostats are, typically, in operable communication with one or more types of sensors. For example, the thermostat can include one or more sensors that are in operable communication with a respective peripheral device of the HVAC system. The thermostat can also include an onboard temperature sensor, and one or more remote temperature sensors, which serve as a primary sensor, and which is connected to the thermostat via a wired connection or a wireless connection. The onboard temperature sensor and the remote sensor are used to control a temperature of an enclosed area, with the onboard temperature sensor serving as a secondary or backup sensor and being activated if the remote temperature sensor fails.

During operation of the HVAC system, if the remote temperature sensor should fail, e.g., a battery of the remote temperature sensor dies, the onboard temperature sensor is activated by a controller of the thermostat, so that a desired temperature can be maintained in the enclosed area. However, because there may be a temperature difference between the remote temperature sensor and the onboard temperature sensor (which could range from 3-6 degrees Fahrenheit, based on a location of the remote temperature sensor in relation to the onboard temperature sensor), there exists the likelihood of operation of the HVAC system being temporarily suspended, or stage cycling of the HVAC system occurring, when the onboard sensor is activated.

SUMMARY

The present disclosure has been made to address the above problems and disadvantages, and to provide at least the advantages described below. Accordingly, an aspect of the present disclosure provides a control algorithm that is configured to compensate for a temperature difference between a primary temperature sensor and a backup temperature sensor, thereby providing a more reliable and smoother transition from the primary temperature sensor to the backup temperature sensor when the primary sensor fails or does not operate as intended.

In accordance with an aspect of the present disclosure, there is provided a heating, ventilation and air condition (HVAC) system. The system includes a thermostat including an onboard temperature sensor, a remote temperature sensor in operable communication with the thermostat, and a controller in operable communication with each of the onboard sensor and the remote sensor and configured to execute a control algorithm that calculates a temperature difference between a temperature detected by the onboard temperature sensor and a temperature detected by the remote temperature sensor, such that when the remote temperature sensor fails, the controller uses the calculated temperature difference to calibrate the onboard temperature sensor. The thermostat may be set (e.g., a current temperature reading for the conditioned space) to the temperature detected by the remote temperature sensor.

The control algorithm may be configured to calculate the temperature difference by mapping a temperature detected by the remote temperature sensor to a temperature detected by the onboard sensor over a time period, calculate an error constant based on the mapped temperatures, and calibrate the onboard temperature sensor. The thermostat may be set to the temperature detected by the remote temperature sensor. The time period may be divided into a plurality of time periods and the error constant is calculated for each time period of the plurality of time periods. The plurality of time periods may include four time periods. The control algorithm may be further configured to analyze a pattern of the error constant over one time period of the plurality of time periods, if the pattern of the error constant deviates beyond a predetermined threshold pattern for a predetermined time, alert a user, via the thermostat, of the deviation, and calibrate the onboard temperature sensor. The thermostat may be set to the temperature detected by the remote temperature sensor.

The remote temperature sensor can be connected to the thermostat via a wireless connection or a wired connection. The onboard temperature sensor can be configured as a backup sensor, and the remote temperature sensor can be configured as a primary sensor.

The control algorithm calculates the error constant using the equations:

$$\Delta T[n] = onboardtemperaturesensor[n] - remotetemperaturesensor[n] \quad (1)$$

$$\alpha = \exp\left(\frac{-1}{t*fs}\right) \quad (2)$$

$$errorconstant[n] = \alpha \; errorconstant[n-1] + (1-\alpha)\Delta T[n] \quad (3)$$

where t is a time constant and fs is a sample rate.

In accordance with an aspect of the present disclosure, there is provided a method for controlling a heating, ventilation and air condition (HVAC) system with a remote temperature sensor and onboard temperature sensor. The method includes executing, using a controller, a control algorithm that calculates a temperature difference between a temperature detected by the onboard temperature sensor. A current temperature reading of a thermostat of the HVAC system may be set to the temperature detected by the remote temperature sensor.

The method can include calculating the temperature difference by mapping a temperature detected by the remote temperature sensor to a temperature detected by the onboard sensor over a time period, calculating an error constant based on the mapped temperatures, and calibrating the onboard temperature sensor and setting the thermostat to the temperature detected by the remote temperature sensor.

The method can include dividing the time period into a plurality of time periods and calculating the error constant for each time period of the plurality of time periods. The plurality of time periods may include four time periods.

The method can include analyzing a pattern of the error constant over one of the four time periods, if the pattern of the error constant deviates beyond a predetermined threshold pattern for a predetermined time, alerting a user, via the thermostat, of the deviation, and calibrating the onboard temperature sensor and set the thermostat to the temperature detected by the remote temperature sensor.

The temperature sensor can be connected to the thermostat via a wireless connection or a wired connection. The onboard temperature sensor can be configured as a backup sensor, and the remote temperature sensor can be configured as a primary sensor.

The control algorithm calculates the error constant using the equations:

$$\Delta T[n] = onboardtemperaturesensor[n] - remotetemperaturesensor[n] \quad (1)$$

$$\alpha = \exp\left(\frac{-1}{t * fs}\right) \quad (2)$$

$$errorconstant[n] = \alpha \; errorconstant[n-1] + (1-\alpha)\Delta T[n] \quad (3)$$

where t is a time constant and fs is a sample rate.

In accordance with an aspect of the present disclosure, there is provided a building automation system (BAS) system. The system includes a thermostat including an onboard temperature sensor, a remote temperature sensor in operable communication with the thermostat, and a controller in operable communication with each of the onboard sensor and the remote sensor and configured to execute a control algorithm that calculates a temperature difference between a temperature detected by the onboard temperature sensor and a temperature detected by the remote temperature sensor, such that when the remote temperature sensor fails, the controller uses the calculated temperature difference to calibrate the onboard temperature sensor and set the thermostat to the temperature detected by the remote temperature sensor.

The control algorithm can be configured to calculate the temperature difference by mapping a temperature detected by the remote temperature sensor to a temperature detected by the onboard temperature sensor over a time period, calculate an error constant based on the mapped temperatures, and calibrate the onboard temperature sensor and set the thermostat to the temperature detected by the remote temperature sensor.

The time period can be divided into a plurality of time periods and the error constant can be calculated for each time period of the plurality of time periods. The plurality of time periods may include four time periods.

The control algorithm can be further configured to analyze a pattern of the error constant over one of the four time periods, if the pattern of the error constant deviates beyond a predetermined threshold pattern for a predetermined time, alert a user, via the thermostat, of the deviation, and calibrate the onboard temperature sensor and, optionally, set the thermostat current temperature reading to the temperature detected by the remote temperature sensor.

The remote temperature sensor can be connected to the thermostat via a wireless connection or a wired connection. The onboard temperature sensor can be configured as a backup sensor, and the remote temperature sensor can be configured as a primary sensor.

In accordance with an aspect of the present disclosure, there is provided a heating, ventilation and air condition (HVAC) system having a thermostat. The thermostat can include an onboard temperature sensor, a remote temperature sensor in operable communication with the thermostat, and a controller in operable communication with each of the onboard sensor and the remote sensor and configured to execute a control algorithm that calculates an error constant based on temperatures detected by the onboard temperature sensor and the remote temperature sensor over a time period, such that when the remote temperature sensor fails, the controller uses the calculated error constant to calibrate the onboard temperature sensor and set a current temperature reading of the thermostat to a temperature detected by the remote temperature sensor.

The detected temperatures of the onboard temperature sensor and the remote temperature sensor can be mapped over the time period.

The time period can be divided into a plurality of time periods and the error constant can be calculated for each time period of the plurality of time periods. The plurality of time periods may include four time periods.

The control algorithm can be further configured to analyze a pattern of the error constant over one time period of the plurality of time periods, if the pattern of the error constant deviates beyond a predetermined threshold pattern for a predetermined time, alert a user, via the thermostat, of the deviation, and calibrate the onboard temperature sensor and set a current indicated temperature of the thermostat to the temperature detected by the remote temperature sensor.

BRIEF DESCRIPTION OF THE DRAWINGS

The embodiments of the present disclosure may be more completely understood in consideration of the following detailed description of various embodiments in connection with the accompanying drawings, in which.

The various aspects of the present disclosure mentioned above are described in further detail with reference to the aforementioned figures and the following detailed description of embodiments.

DETAILED DESCRIPTION

The systems and methods of the disclosure can be utilized in a residential, local or widely distributed HVAC systems, from a single family unit or building to an enterprise level, encompassing any structure, cluster, campus, and areas therebetween. Systems and methods for residential and commercial HVAC control are disclosed in U.S. patent application Ser. No. 11/208,773, now U.S. Pat. No. 8,050,801, filed Aug. 22, 2005, entitled "Dynamically Extensible and Automatically Configurable Building Automation System and Architecture" and U.S. patent application Ser. No. 15/186,715 (U.S. Patent Publication No. 2016/0370023), filed Jun. 20, 2016, entitled "Fault Detection and Diagnostics System Utilizing Service Personal Feedback for Improved Accuracy," both of which are assigned to the assignee of the present application, and are herein incorporated by reference.

As noted above, smart thermostats and/or BASs do not provide for temperature differences between an on board temperature sensor and a remote temperature sensor. Accordingly, described herein is an HVAC system including a thermostat (or an HVAC system that is controlled by a BAS) controlled by a controller configured to execute one or more control algorithms that are configured to compensate for a temperature difference between the remote temperature sensor and an onboard temperature sensor. For illustrative purposes, the aspects of the present disclosure will be described herein with reference to a thermostat.

Figure 1:
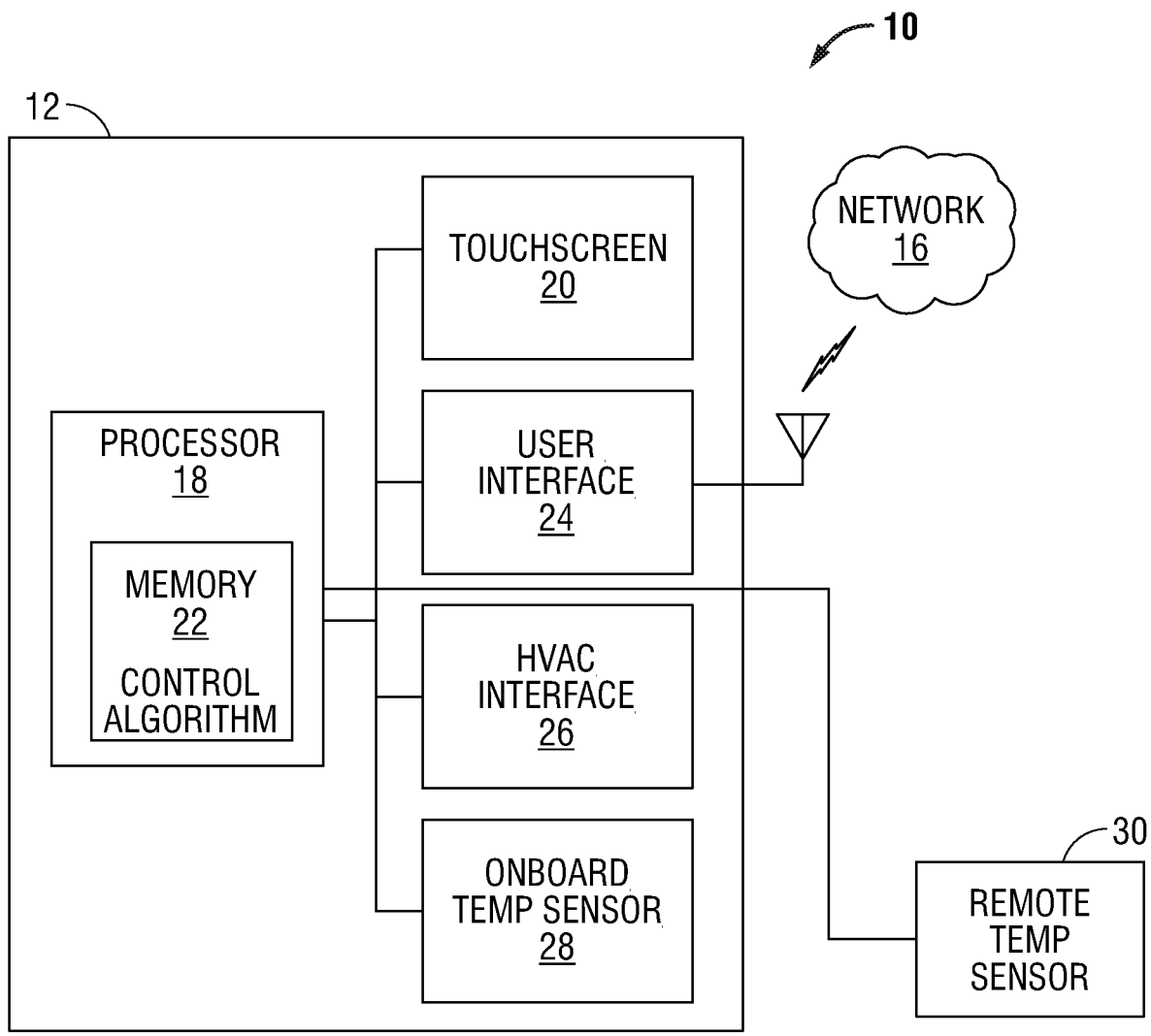
FIG. 1 is a diagram of a system including a thermostat, according to an embodiment of the present disclosure.

FIG. 1 is a diagram of a system 10 including a thermostat 12, according to an embodiment of the present disclosure.

The thermostat 12 includes a processor 18 (or controller), a touch screen 20, a memory 22, a user interface (UI) 24, an HVAC interface 26, an onboard temperature sensor 28, and a remote temperature sensor 30. The thermostat 12 can communicate with the remote temperature sensor 30 via a network 16, and can also include one or more other sensors that are configured to monitor one or more peripheral components (not shown) of the HVAC system.

When the processor 18 is a component of a BAS (e.g., HVAC system is operable in a commercial environment), the processor 18 controls the overall operation of the HVAC system and can communicate, via a wired or wireless interface, with the components of the HVAC system. For example, the processor 18 can communicate with the components of the HVAC system using a wireless communication protocol including, without limitation, any variant of IEEE 802.11 (commonly known as WiFi), variants of IEEE 802.15 wireless personal area networking such as Bluetooth® and ZWave®, and other wireless standards such as ZigBee® or the AirFi™ protocol promulgated by Trane International Inc. of Davidson, N.C., USA. Alternatively, the processor 18 can be configured to communicate using a wired protocol using dedicated data lines (e.g., Ethernet), via powerline communication links using, for example, IEEE 1901 and/or X10®, or via a dual-band (wireless plus powerline) protocol such as the Insteon® protocol.

Likewise, when the processor 18 is a component of an HVAC system used in a residential environment, the processor 18 can control the overall operation of the HVAC system, via the HVAC interface 26 and/or via the network 16 (which may include a LAN and/or the public internet). The HVAC interface 26 may be configured to communicate between thermostat 12 and the one or more peripheral components using any communications protocol suitable for use with the system. For example, and without limitation, where indoor units, outdoor units, and/or furnaces (not explicitly shown) employ single- or dual-speed motors, HVAC interface 26 may include a 24V switched circuit interface which operates with well-known HVAC color-coded wiring schemes (Rc, Rh, C, Y, W, Y2, W2, G, E, O, V, etc.). Where the indoor units and/or outdoor units employ variable-speed motors, HVAC interface 26 may include a digital signaling interface such as, without limitation, CAN-bus, RS-485, ComfortLink II™, ClimateTalk™, and the like. In embodiments, HVAC interface 26 may operate using both 24V switched circuits and digital signaling protocols to flexibly accommodate any combination of HVAC equipment. In embodiments, any of the functions of data interface 14 may be performed by HVAC interface 26, and vice versa. In embodiments, HVAC interface 26 may be incorporated within a data interface (not shown).

Additionally or alternatively, the processor 18 can be configured for communication with one or more remote devices that are in operable communication with the HVAC system via network 16 (which may include a LAN and/or the public internet). The remote device may include, without limitation, a mobile device (smart phone, tablet computer, and the like) and/or the remote server 14 (such as a dealer diagnostic portal, a fuel marketplace server, a weather data provider, other data providers, and so forth). Furthermore, the processor 18 can be configured to communicate using a wide area cellular mobile network using, for example and without limitation, a GSM protocol (3G, 4G, LTE etc.), a CDMA protocol (EV-DO, SV-DO, etc.), and so forth.

The processor 18 can include a data interface module (not shown), which can function as a WiFi/AirFi™ hot-spot or wired router to enable the processor 18 and/or the components of the HVAC system (e.g., the thermostat 12) or other components (e.g., one or more smart devices including, without limitation, a smart watch, a smart phone, a smart tablet, smart remote, etc.) in operative communication with the processor 18 to connect to the network 16 (or the Internet).

Figure 7:
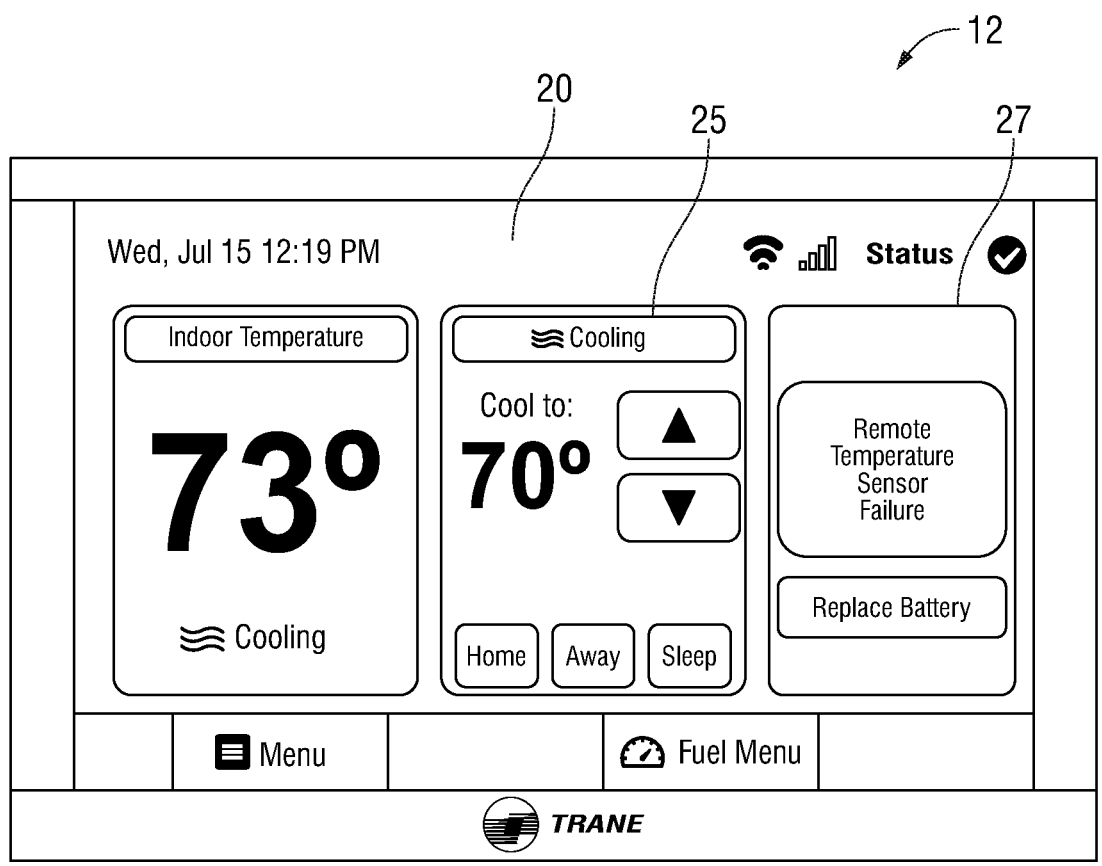
FIG. 7 is a diagram of the thermostat of FIG. 1 illustrating an alert that is provided on a touchscreen of the thermostat.

The touch screen 20, under the control of the processor 18 and in conjunction with the user interface 24, can display one or more graphical user interfaces (GUIs) for receiving a touch input from a user for selecting one or more various functions of the thermostat 12. For example, the touch screen 20 can display a GUI 25 (FIG. 7) for allowing a user to set the thermostat 12 to a desired temperature setting, or in accordance with the present disclosure, the touch screen 20 can display a GUI 27 that is configured alert or notify a user if the remote temperature sensor 30 should fail (see FIG. 7, for example), as will be described in greater detail below.

Figure 2:
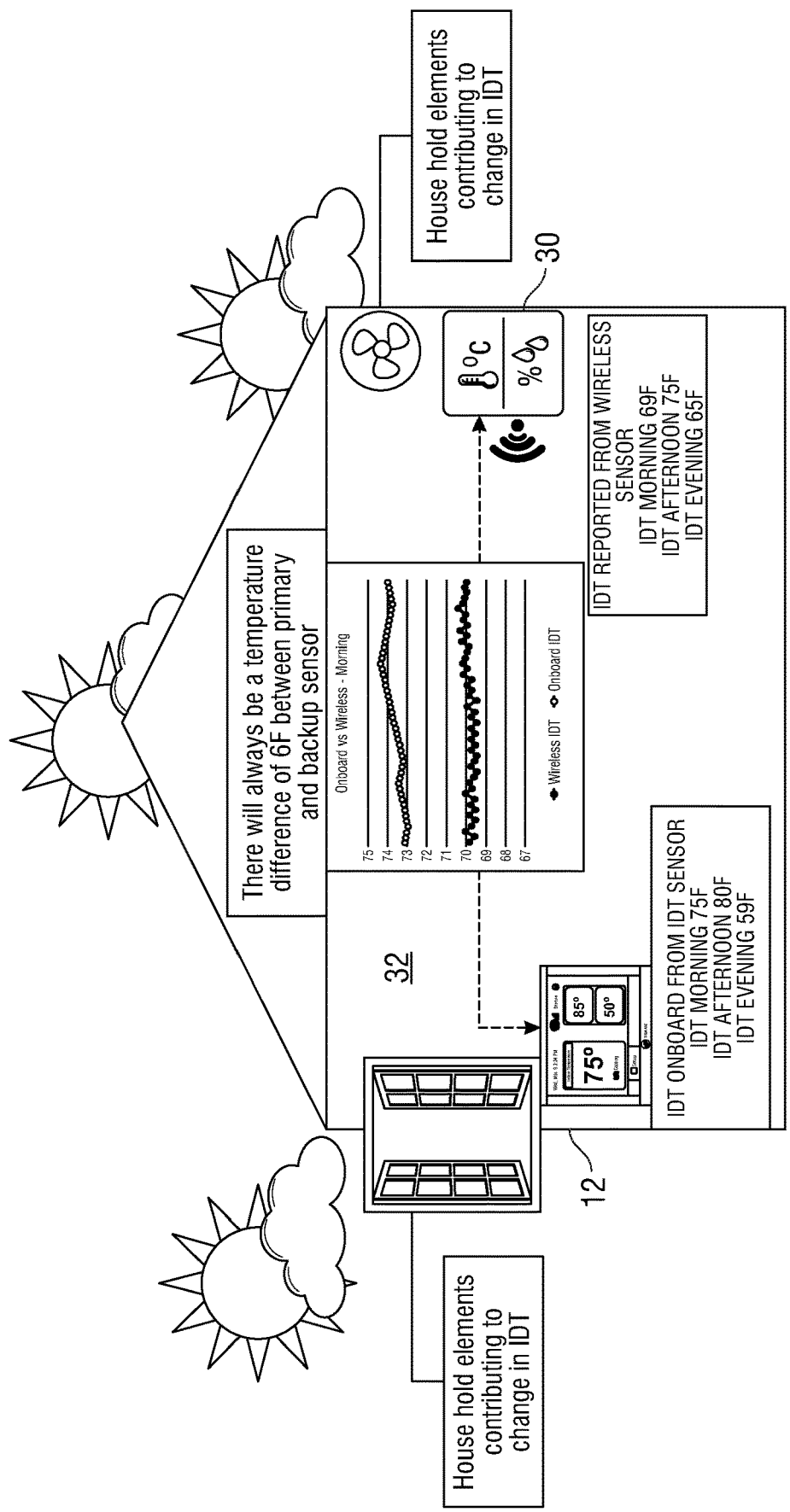
FIG. 2 is a diagram of the thermostat of FIG. 1 in an enclosed area.
Figure 3:
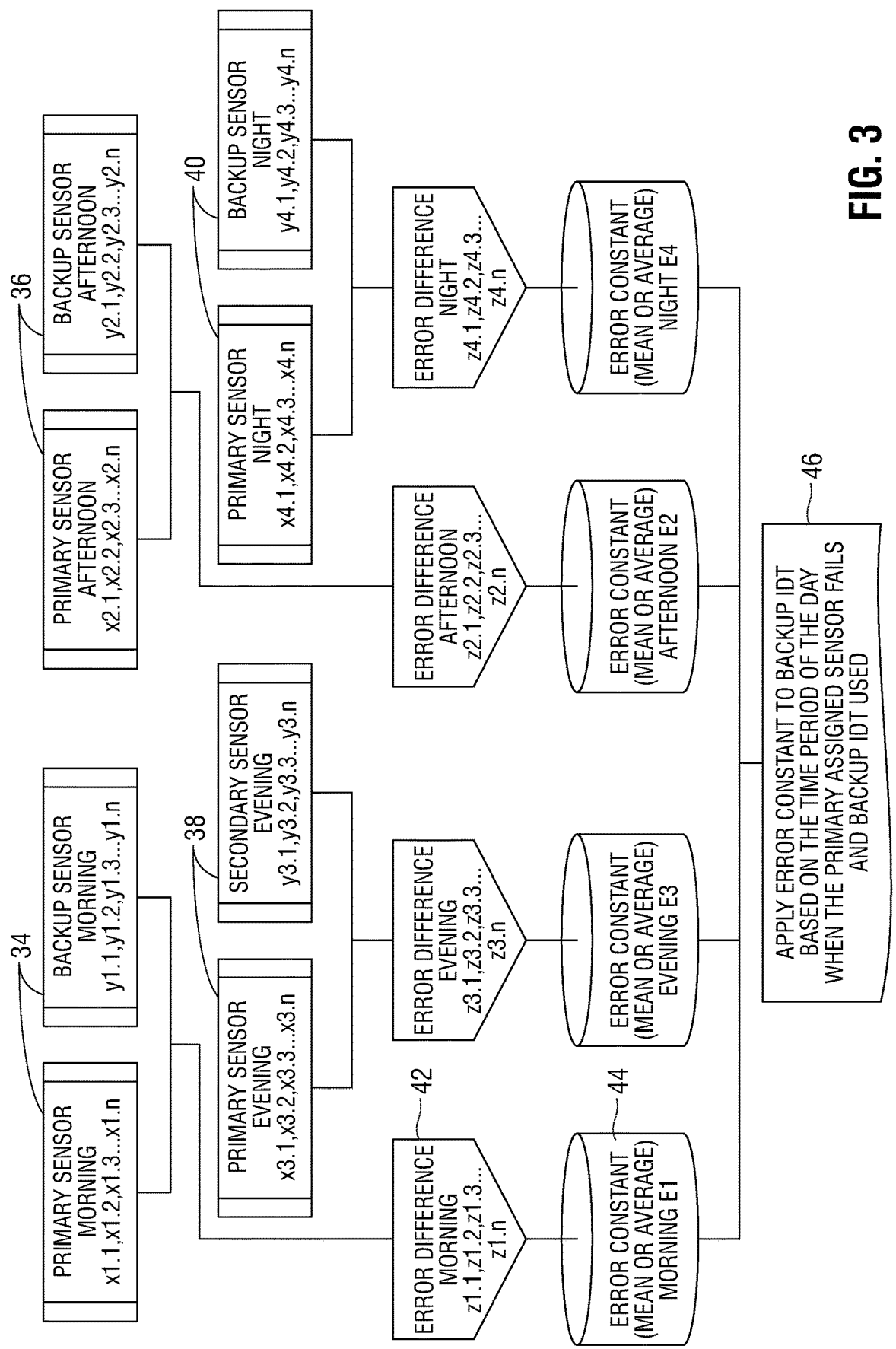
FIG. 3 is a flow diagram of a control algorithm used by a controller of the thermostat of FIG. 1.

The HVAC interface 26, under the control of the processor 18 and in conjunction with the remote temperature sensor 30 (and/or the onboard temperature sensor 28), can monitor an indoor temperature (IDT) of an enclosed area 32 (FIG. 2).

In accordance with the present disclosure, the processor 18 executes one or more control algorithms, which can be stored in the memory 22, to calibrate the onboard temperature sensor 28 to a temperature that is equal to (or approximately equal to) a temperature last detected by the remote temperature sensor 30. To this end, the control algorithm calculates a temperature difference between a temperature detected by the onboard temperature sensor 28 and a temperature detected by the remote temperature sensor 30. The control algorithm uses the calculated temperature difference to calibrate the onboard temperature sensor 28 and set the thermostat 12 to a temperature last detected by the remote temperature sensor 30, thereby ensuring a smooth transition from the remote temperature sensor 30 to the onboard temperature sensor 28 if the remote temperature sensor 30 should fail, or become inoperable.

Figure 5A:
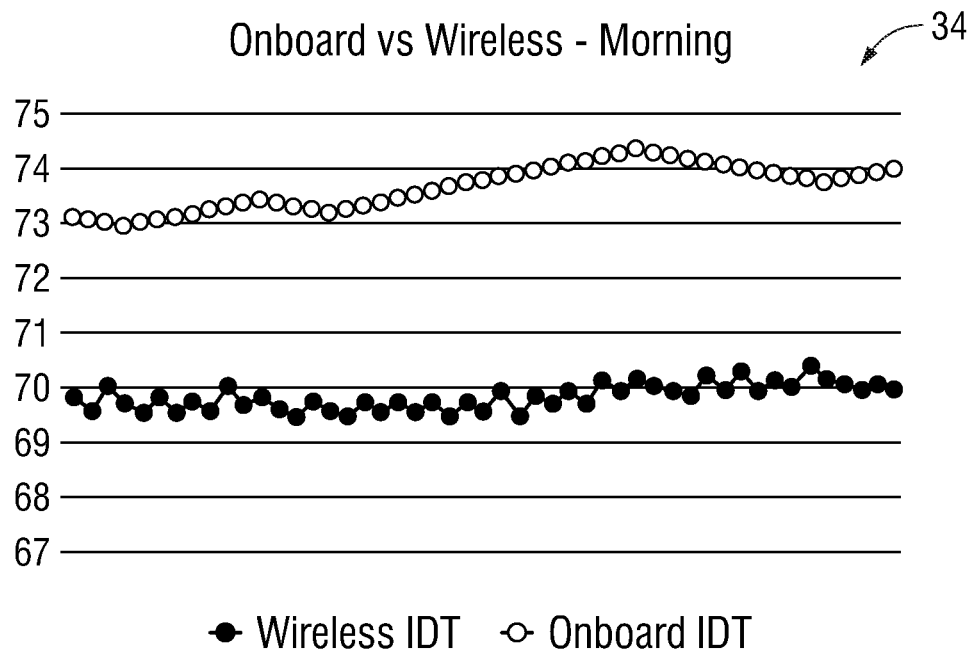
FIGS. 5A-5D are graphs illustrating temperature differences between an onboard temperature sensor and a remote temperature sensor of the thermostat of FIG. 1.
Figure 5B:
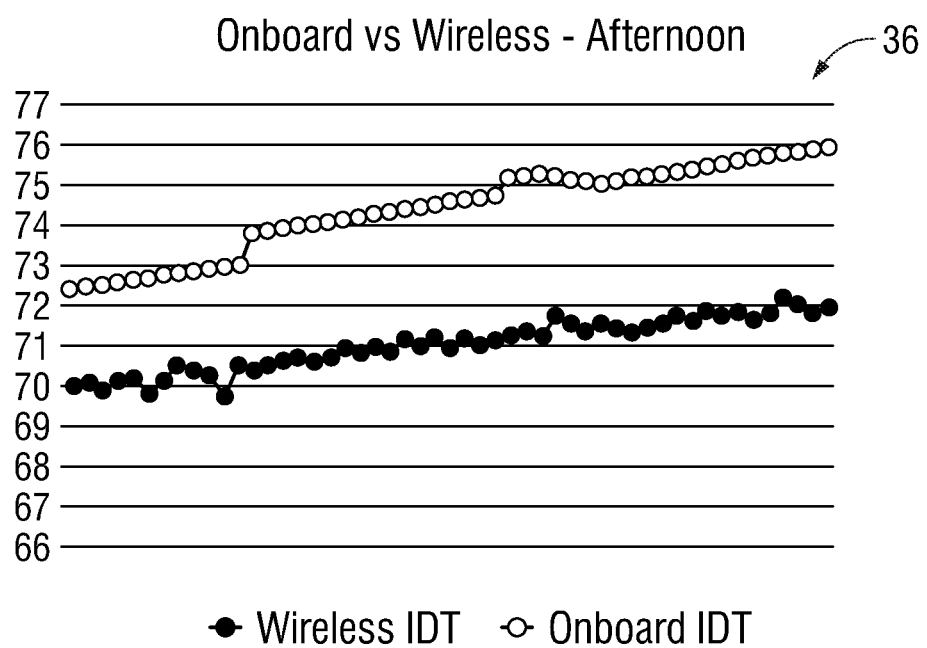
Figure 5C:
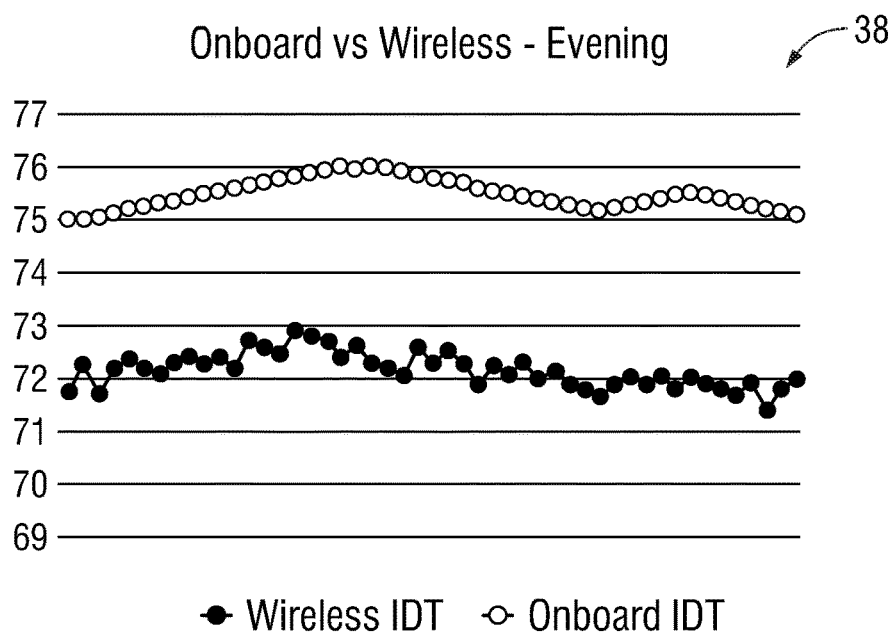
Figure 5D:
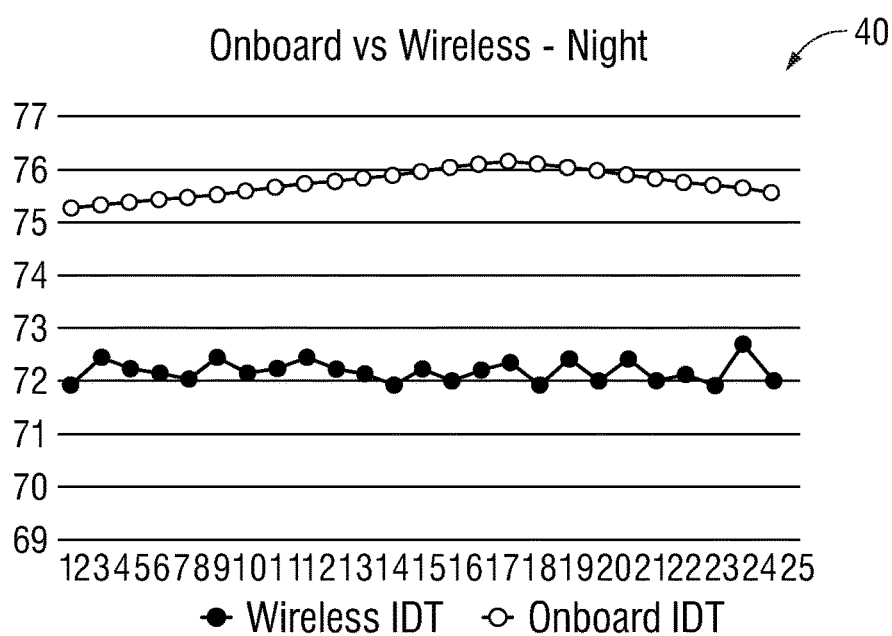

More particularly, the control algorithm uses mapped IDTs that have been detected by the remote temperature sensor 30 and the onboard temperature sensor 28 over one or more time periods (e.g., morning 34, afternoon 36, evening 38, and night 40) during a course of a day, as illustrated in FIGS. 3 and 5A-5D. For example, as illustrated in FIG. 5A, an IDT detected by the remote temperature sensor 30 during the morning 34 can range from about 69 degrees Fahrenheit to about 71 degrees Fahrenheit, and an IDT detected by the onboard temperature sensor 28 during the same time period can range from about 73 degrees Fahrenheit to about 74 degrees Fahrenheit, the IDT detected by the remote temperature sensor 30 is always less than the onboard temperature sensor 28. As can be appreciated, the temperatures described herein are merely for illustrative purposes, and other temperature ranges are also contemplated.

The control algorithm uses the mapped temperatures and one or more methods to calculate an error constant for the morning 34. In an embodiment, the control algorithm calculates error differences for the mapped temperatures (see reference number 42 in FIG. 3), and calculates a mean or average of the calculated error differences to calculate the error constant for the morning 34 (see reference number 44 in FIG. 3); the control algorithm calculates the error constant for each of the four time periods in this manner, and uses the calculated error constant to calibrate the onboard temperature sensor 28 to a temperature for that time period (see reference number 46 in FIG. 3), which will be equal to (or approximately equal to) a last detected temperature of the remote temperature sensor 30. In an embodiment, multiple onboard and/or remote sensors may be averaged with a filter, such that the removal of one sensor has negligible immediate effect but over time the contribution of that sensor is lessened in favor of the other sensors.

In an embodiment, the control algorithm calculates the error constant by accumulating the error difference using a time constant t, e.g., 30 minutes, thereby filtering the error difference over the period defined by the time constant. When the remote temperature sensor 30 fails, the calculated error constant is used for the duration of the time constant and is used to calibrate the onboard temperature sensor 28 using the calculated error constant. The control algorithm can use the following equations:

$$\Delta T[n] = onboardtemperaturesensor[n] - remotetemperaturesensor[n] \quad (1)$$

$$\alpha = \exp\left(\frac{-1}{t * fs}\right), \quad (2)$$

where $t$ is a time constant and $fs$ is the sample rate.

$$errorconstant[n] = \alpha \; errorconstant[n-1] + (1-\alpha)\Delta T[n] \quad (3)$$

Figure 4:
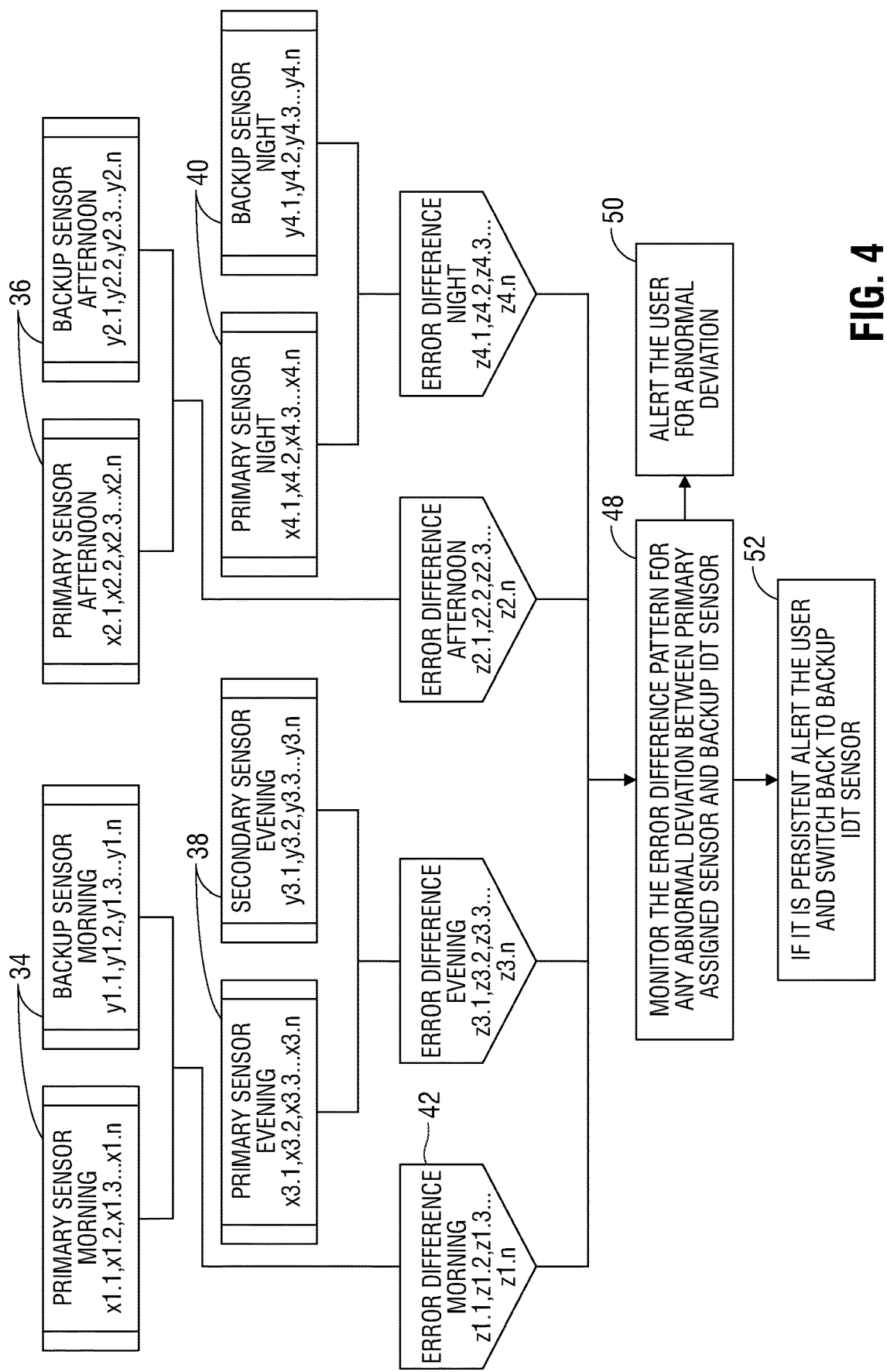
FIG. 4 is a flow diagram of another control algorithm used by the controller of the thermostat of FIG. 1.

In an embodiment, the control algorithm can use orthogonal regression analysis, which analyzes a linear relationship between continuous variables, e.g., a response variable (y) and a predictor variable (x), and the error difference to monitor an error difference pattern (see reference number 48 in FIG. 4) of the onboard temperature sensor 28 and the remote temperature sensor 30. If the error difference pattern deviates from a predetermined threshold and/or for a predetermined time period, which can be an indication that the remote temperature sensor 30 is inoperable or not functioning as intended, the control algorithm provides an alert or notification in the form of a GUI 27 (FIG. 7) on the touchscreen 20 of the thermostat 12 to a user, and/or activates the onboard temperature sensor 28 until the remote temperature sensor 30 becomes operable again (see reference numbers 50 and 52 in FIG. 4). The alert or notification can also be provided via the Nexia Web Portal, Nexia Mobile App, and/or Nexia Diagnostic Portal. A deviation of the error difference pattern from the predetermined threshold can be a result of a sudden change in temperature detected by the remote temperature sensor 30, e.g., a door or window in the enclosed area 32 is suddenly opened, or an appliance in the enclosed area 32 is turned on or off (see FIG. 2, for example).

Figure 6:
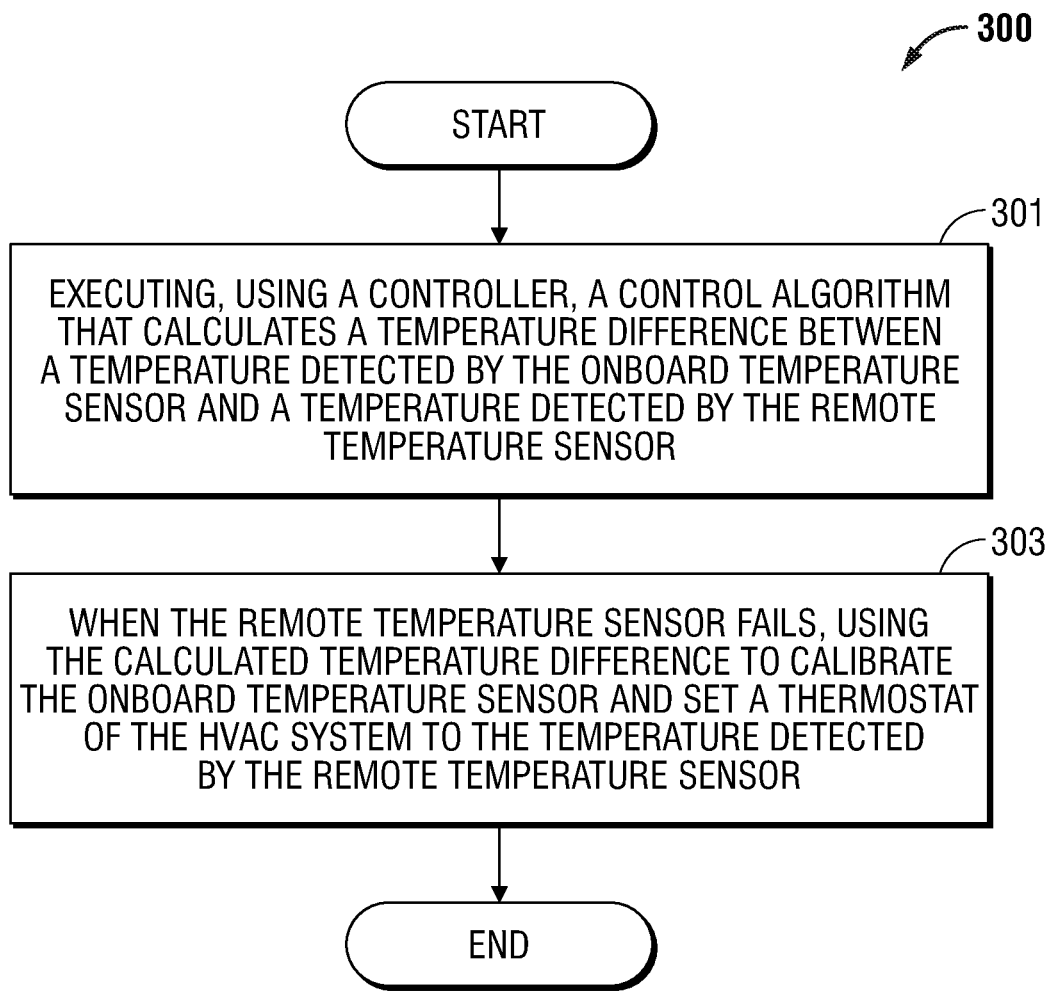
FIG. 6 is a flowchart of a method for controlling an HVAC system including the thermostat, the remote temperature sensor, and the onboard temperature sensor.

A method 300 of use of the thermostat 12 is now described with reference to FIG. 6. For illustrative purposes, it is assumed that a user sets the thermostat for cooling and to 70 degrees Fahrenheit, the remote temperature sensor 30 is detecting an IDT of 73 degrees Fahrenheit, and the onboard temperature sensor 28 is detecting an IDT of 79 degrees Fahrenheit.

If the remote temperature sensor 30 becomes inoperable, e.g., the battery of the remote temperature sensor 30 fails, the processor 18 executes the control algorithm in the memory 22 to calculate the error constant, in a manner as described above, at step 301.

At step 303, the processor 18 calibrates the onboard temperature sensor 28 to a temperature that is equal to (or approximately equal to) last detected temperature of the remote temperature sensor 30, i.e., 73 degrees Fahrenheit.

In addition, the processor 18 can also alert and/or notify a user of the faulty remote temperature sensor 30 by displaying the GUI 27 (FIG. 7) on the touchscreen 20 of the thermostat 12, or by providing an audio alert.

As can be appreciated, the thermostat 12 including the control algorithm can prevent stage cycling and sudden stage transition if the remote temperature sensor 30 should fail, thereby increasing user comfort and overall HVAC system efficiency.

From the foregoing and with reference to the various Figures, those skilled in the art will appreciate that certain modifications can also be made to the present disclosure without departing from the scope of the same. For example, while it has been described herein that the control algorithm uses a mean or average of the error differences to calculate the error constant, other processes can also be used. For example, other statistical calculations or equations can also be used to calculate the error constant. Additionally, the control algorithm can use other parameters in addition to the mapped temperature differences when calculating the error constant. For example, anticipated comings and goings of occupants of the enclosed area 32, which could cause sudden increase and/or decrease an IDT.

ASPECTS

It is noted that any of aspects 1-24 may be combined with each other in any suitable combination.

Aspect 1. A heating, ventilation and air condition (HVAC) system, the system comprising: a thermostat including an onboard temperature sensor; a remote temperature sensor in operable communication with the thermostat; and a controller in operable communication with each of the onboard sensor and the remote sensor and configured to execute a control algorithm that calculates a temperature difference between a temperature detected by the onboard temperature sensor and a temperature detected by the remote temperature sensor, such that when the remote temperature sensor fails, the controller uses the calculated temperature difference to calibrate the onboard temperature sensor. The indicated temperature of the thermostat may be set to the temperature detected by the remote temperature sensor.

Aspect 2. The system of aspect 1, wherein the control algorithm is configured to calculate the temperature difference by mapping a temperature detected by the remote temperature sensor to a temperature detected by the onboard sensor over a time period, calculate an error constant based on the mapped temperatures, and calibrate the onboard temperature sensor. The indicated room temperature of the thermostat may be set to the temperature detected by the remote temperature sensor.

Aspect 3. The system of aspect 1 or 2, wherein the time period is divided into a plurality of time periods and the error constant is calculated for each time period of the plurality of time periods.

Aspect 4. The system of any of aspects 1-3, wherein the control algorithm is further configured to analyze a pattern of the error constant over one time period of the plurality of time periods, if the pattern of the error constant deviates beyond a predetermined threshold pattern for a predetermined time, alert a user, via the thermostat, of the deviation, and calibrate the onboard temperature sensor. The indicated room temperature of the thermostat may be set to the thermostat to the temperature detected by the remote temperature sensor.

Aspect 5. The system of any of aspects 1-4, wherein the remote temperature sensor is connected to the thermostat via a wireless connection or a wired connection.

Aspect 6. The system of any of aspects 1-5, wherein the onboard temperature sensor is configured as a backup sensor, and wherein the remote temperature sensor is configured as a primary sensor.

Aspect 7. The system of claim 1-6, wherein the control algorithm calculates the error constant using the equations:

$$\Delta T[n] = onboardtemperaturesensor[n] - remotetemperaturesensor[n] \quad (1)$$

$$\alpha = \exp\left(\frac{-1}{t * fs}\right) \quad (2)$$

$$errorconstant[n] = \alpha \ errorconstant[n-1] + (1-\alpha)\Delta T[n] \quad (3)$$

where t is a time constant and fs is the sample rate.

Aspect 8. A method for controlling a heating, ventilation and air condition (HVAC) system with remote temperature sensor and onboard temperature sensor, the method comprising: executing, using a controller, a control algorithm that calculates a temperature difference between a temperature detected by the onboard temperature sensor and a temperature detected by the remote temperature sensor; and when the remote temperature sensor fails, using the calculated temperature difference to calibrate the onboard temperature sensor. The indicated temperature reading of the thermostat of the HVAC system may be set to the temperature detected by the remote temperature sensor.

Aspect 9. The method of aspect 8, further comprising calculating the temperature difference by mapping a temperature detected by the remote temperature sensor to a temperature detected by the onboard sensor over a time period, calculating an error constant based on the mapped temperatures, and calibrating the onboard temperature sensor. The indicated temperature reading of a thermostat of the HVAC system may be set to the temperature detected by the remote temperature sensor.

Aspect 10. The method of aspect 8 or 9, further comprising dividing the time period into a plurality of time periods and calculating the error constant for each time period of the plurality of time periods.

Aspect 11. The method of any of aspects 8-10, further comprising analyzing a pattern of the error constant over one time period of the plurality of time periods, if the pattern of the error constant deviates beyond a predetermined threshold pattern for a predetermined time, alerting a user, via the thermostat, of the deviation, and calibrating the onboard temperature sensor. The indicated temperature reading of a thermostat of the HVAC system may be set to the temperature detected by the remote temperature sensor.

Aspect 12. The method of any of aspects 8-11, wherein the remote temperature sensor is connected to the thermostat via a wireless connection or a wired connection.

Aspect 13. The method of any of aspects 8-12, wherein the onboard temperature sensor is configured as a backup sensor, and wherein the remote temperature sensor is configured as a primary sensor.

Aspect 14. The method of any of aspects 8-13, wherein the control algorithm calculates the error constant using the equations:

$$\Delta T[n] = onboardtemperaturesensor[n] - remotetemperaturesensor[n] \quad (1)$$

$$\alpha = \exp\left(\frac{-1}{t * fs}\right) \quad (2)$$

$$errorconstant[n] = \alpha \ errorconstant[n-1] + (1-\alpha)\Delta T[n] \quad (3)$$

where t is a time constant and fs is the sample rate.

Aspect 15. A building automation system (BAS) system, the system comprising: a thermostat including an onboard temperature sensor; a remote temperature sensor in operable communication with the thermostat; and a controller in operable communication with each of the onboard sensor and the remote sensor and configured to execute a control algorithm that calculates a temperature difference between a temperature detected by the onboard temperature sensor and a temperature detected by the remote temperature sensor, such that when the remote temperature sensor fails, the controller uses the calculated temperature difference to calibrate the onboard temperature sensor. The indicated room temperature of the thermostat may be set to the temperature detected by the remote temperature sensor.

Aspect 16. The system of aspect 15, wherein the control algorithm is configured to calculate the temperature difference by mapping a temperature detected by the remote temperature sensor to a temperature detected by the onboard sensor over a time period, calculate an error constant based on the mapped temperatures, and calibrate the onboard temperature sensor and set the thermostat to the temperature detected by the remote temperature sensor.

Aspect 17. The system of aspect 15 or 16, wherein the time period is divided into a plurality of time periods and the error constant is calculated for each time period of the plurality of time periods.

Aspect 18. The system of any of aspects 15-17, wherein the control algorithm is further configured to analyze a pattern of the error constant over one time period of the plurality of time periods, if the pattern of the error constant deviates beyond a predetermined threshold pattern for a predetermined time, alert a user, via the thermostat, of the deviation, and calibrate the onboard temperature sensor. The indicated room temperature of thermostat may be set to the temperature detected by the remote temperature sensor.

Aspect 19. The system of claim any of aspects 15-18, wherein the remote temperature sensor is connected to the thermostat via a wireless connection or a wired connection.

Aspect 20. The system of claim any of aspects 15-19, wherein the onboard temperature sensor is configured as a backup sensor, and wherein the remote temperature sensor is configured as a primary sensor.

Aspect 21. A heating, ventilation and air condition (HVAC) system, the system comprising: a thermostat including an onboard temperature sensor; a remote temperature sensor in operable communication with the thermostat; and a controller in operable communication with each of the onboard sensor and the remote sensor and configured to execute a control algorithm that calculates an error constant based on temperatures detected by the onboard temperature sensor and the remote temperature sensor over a time period, such that when the remote temperature sensor fails, the controller uses the calculated error constant to calibrate the onboard temperature sensor and set the thermostat to a temperature detected by the remote temperature sensor.

Aspect 22. The system of aspect 21, wherein the detected temperatures of the onboard temperature sensor and the remote temperature sensor are mapped over the time period.

Aspect 23. The system of aspect 21 or 22, wherein the time period is divided into four time periods and the error constant is calculated for each of a plurality of time periods.

Aspect 24. The system of any of aspects 21-23, wherein the control algorithm is further configured to analyze a pattern of the error constant over one of the four time periods, if the pattern of the error constant deviates beyond a predetermined threshold pattern for a predetermined time, alert a user, via the thermostat, of the deviation, and calibrate the onboard temperature sensor. The indicated room temperature reading of the thermostat may be set to the temperature detected by the remote temperature sensor.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A heating, ventilation and air condition (HVAC) system, the system comprising:
   a thermostat including an onboard temperature sensor;
   a remote temperature sensor in operable communication with the thermostat; and
   a controller in operable communication with each of the onboard temperature sensor and the remote temperature sensor and configured to execute a control algorithm that calculates a temperature difference between a temperature detected by the onboard temperature sensor and a temperature detected by the remote temperature sensor, such that when the remote temperature sensor fails, the controller uses the calculated temperature difference to calibrate the onboard temperature sensor.

2. The system of claim 1, wherein the control algorithm is configured to calculate the temperature difference by mapping a temperature detected by the remote temperature sensor to a temperature detected by the onboard temperature sensor over a time period, calculate an error constant based on the mapped temperatures, and calibrate the onboard temperature sensor.

3. The system of claim 2, wherein the time period is divided into a plurality of time periods and the error constant is calculated for each time period of the plurality of time periods.

4. The system of claim 3, wherein the control algorithm is further configured to analyze a pattern of the error constant over one time period of the plurality of time periods, if the pattern of the error constant deviates beyond a predetermined threshold pattern for a predetermined time, alert a user, via the thermostat, of the deviation, and calibrate the onboard temperature sensor.

5. The system of claim 2, wherein the control algorithm calculates the error constant using the equations:

$$\Delta T[n] = onboardtemperaturesensor[n] - remotetemperaturesensor[n] \quad (1)$$

$$\alpha = \exp\left(\frac{-1}{t * fs}\right) \quad (2)$$

$$errorconstant[n] = \alpha \; errorconstant[n-1] + (1-\alpha)\Delta T[n], \quad (3)$$

wherein t is a defined time constant or interval and fs is a defined sample rate.

6. The system of claim 1, wherein the remote temperature sensor is connected to the thermostat via a wireless connection or a wired connection.

7. The system of claim 1, wherein the onboard temperature sensor is configured as a backup sensor, and
   wherein the remote temperature sensor is configured as a primary sensor.

8. A method for controlling a heating, ventilation and air condition (HVAC) system having a thermostat coupled to a remote temperature sensor and an onboard temperature sensor, the method comprising:
   executing, using a controller, a control algorithm that calculates a temperature difference between a temperature detected by the onboard temperature sensor and a temperature detected by the remote temperature sensor; and
   when the remote temperature sensor fails, using the calculated temperature difference to calibrate the onboard temperature sensor.

9. The method of claim 8, further comprising calculating the temperature difference by mapping a temperature detected by the remote temperature sensor to a temperature detected by the onboard temperature sensor over a time period, calculating an error constant based on the mapped temperatures, and calibrating the onboard temperature sensor.

10. The method of claim 9, further comprising dividing the time period into a plurality of time periods and calculating the error constant for each time period of the plurality of time periods.

11. The method of claim 10, further comprising analyzing a pattern of the error constant over one time period of the plurality of time periods, if the pattern of the error constant deviates beyond a predetermined threshold pattern for a predetermined time, alerting a user, via the thermostat, of the deviation, and calibrating the onboard temperature sensor.

12. The method of claim 9, wherein the control algorithm calculates the error constant using the equations:

$$\Delta T[n] = onboardtemperaturesensor[n] - remotetemperaturesensor[n] \quad (1)$$

$$\alpha = \exp\left(\frac{-1}{t * fs}\right) \quad (2)$$

$$errorconstant[n] = \alpha \; errorconstant[n-1] + (1-\alpha)\Delta T[n], \quad (3)$$

wherein t is a defined time constant or interval and fs is a defined sample rate.

13. The method of claim 8, wherein the remote temperature sensor is connected to the thermostat via a wireless connection or a wired connection.

14. The method of claim 8, wherein the onboard temperature sensor is configured as a backup sensor, and
wherein the remote temperature sensor is configured as a primary sensor.

15. A building automation system (BAS) system, the system comprising:
a thermostat including an onboard temperature sensor;
a remote temperature sensor in operable communication with the thermostat; and
a controller in operable communication with each of the onboard temperature sensor and the remote temperature sensor and configured to execute a control algorithm that calculates a temperature difference between a temperature detected by the onboard temperature sensor and a temperature detected by the remote temperature sensor, such that when the remote temperature sensor fails, the controller uses the calculated temperature difference to calibrate the onboard temperature sensor.

16. The system of claim 15, wherein the control algorithm is configured to calculate the temperature difference by mapping a temperature detected by the remote temperature sensor to a temperature detected by the onboard temperature sensor over a time period, calculate an error constant based on the mapped temperatures, and calibrate the onboard temperature sensor.

17. The system of claim 15, wherein the time period is divided into a plurality of time periods and the error constant is calculated for each time period of the plurality of time periods.

18. The system of claim 17, wherein the control algorithm is further configured to analyze a pattern of the error constant over one time period of the plurality of time periods, if the pattern of the error constant deviates beyond a predetermined threshold pattern for a predetermined time, alert a user, via the thermostat, of the deviation, and calibrate the onboard temperature sensor.

19. The system of claim 18, wherein the remote temperature sensor is connected to the thermostat via a wireless connection or a wired connection.

20. The system of claim 15, wherein the onboard temperature sensor is configured as a backup sensor, and
wherein the remote temperature sensor is configured as a primary sensor.

21. A heating, ventilation and air condition (HVAC) system, the system comprising:
a thermostat including an onboard temperature sensor;
a remote temperature sensor in operable communication with the thermostat; and
a controller in operable communication with each of the onboard temperature sensor and the remote temperature sensor and configured to execute a control algorithm that calculates an error constant based on temperatures detected by the onboard temperature sensor and the remote temperature sensor over a time period, such that when the remote temperature sensor fails, the controller uses the calculated error constant to calibrate the onboard temperature sensor.

22. The system of claim 21, wherein the detected temperatures of the onboard temperature sensor and the remote temperature sensor are mapped over the time period.

23. The system of claim 22, wherein the time period is divided into a plurality of time periods and the error constant is calculated for each time period of the plurality of time periods.

24. The system of claim 23, wherein the control algorithm is further configured to analyze a pattern of the error constant over one time period of the plurality of time periods, if the pattern of the error constant deviates beyond a predetermined threshold pattern for a predetermined time, alert a user, via the thermostat, of the deviation, and calibrate the onboard temperature sensor.

\* \* \* \* \*